Feb. 8, 1955  R. A. ANDERSON  2,701,748
AUTOMATIC PROCESS LOGGING SYSTEM
Filed April 28, 1954  5 Sheets-Sheet 1

Fig. 1

INVENTOR.
Ralph A. Anderson
by Russell E. Hattis  Atty.

United States Patent Office 2,701,748
Patented Feb. 8, 1955

2,701,748

AUTOMATIC PROCESS LOGGING SYSTEM

Ralph Arthur Anderson, Deerfield, Ill., assignor to Panellit, Inc., Chicago, Ill., a corporation of Illinois Application April 28, 1954, Serial No. 426,254

23 Claims. (Cl. 346—34)

This invention relates to automatic process logging systems, particularly to systems utilizing an automatic typewriter to record or log the various conditions of a complicated industrial process.

Information is the foundation upon which the science of automatic control is built. In order to put a process or a machine under effective control, there must be sufficient information available to completely characterize all of its operations. Once this information is converted into visible signals or messages, it can be compared with more or less predetermined criteria, and intelligent, corrective action can be applied to achieve the desired status where abnormal process variables are indicated. This invention concerns itself with a means for placing before an operator large masses of this information in printed form which can be quickly reviewed.

One of the primary objects of this invention is to provide a process logging system which periodically scans a large number of process variables and prints and arranges the process variable data in a manner where this information can be quickly and efficiently reviewed by an operator, and wherein abnormal process variables are indicated in a manner such that they may be quickly pin pointed.

Another object of the invention is to provide an automatic process logging system utilizing an automatic typewriter to record the values of the process variables and wherein abnormal process variables are indicated in a characteristic manner, as, for instance, by a different colored type, so that a ready analysis of all troubles in the monitored process may be obtained quickly.

A further object of the invention is to provide an automatic process logging system which periodically scans a large number of process variables, and during the interim between periodic or cyclical recording, all points in the system are continuously scanned and off-normal points are grouped together in one place on a logging sheet or chart.

A further object of this invention is to provide an automatic logging system with an automatic typewriter which supports a logging sheet in a position where a majority of the coded information may be viewed at all times by an operator without removing the logging sheet from the carriage of the typewriter.

It is a still further object of this invention to provide an automatic process logging system which periodically scans a large number of process variables, and which includes an automatic typewriter which successively records data of the process variables on a logging sheet; an ancillary object of the invention is to provide a process logging system utilizing an automatic recording typewriter wherein the data on successively scanned process variables may be typed in vertical columns proceeding horizontally across the logging sheet even though the size of the typewriter carriage is insufficient to accommodate a logging sheet of sufficient width to receive all of the process variable data scanned during each scanning cycle.

Another object of the invention is to provide an automatic process logging system utilizing an automatic typewriter to record the magnitudes of the process variables, and wherein a logging sheet in the form of a continuous band or roll is provided for receiving the printed information of the process variables scanned during any scanning interval in different segments on the logging sheet, whereby a logging sheet of insufficient width to accommodate all the variables in one line may be utilized.

A still further object of this invention is to provide a process logging system which utilizes the segmentalized logging sheet and further, wherein the logging sheet is so constructed that the line shifting mechanism of the typewriter operates in only one direction in indexing the logging sheet from any segment subsequent to the first segment thereof back to the first segment where subsequent information may be printed.

Another object of the invention is to provide a process logging system of the latter type wherein memory means is provided which memorizes the position of the last recorded line in the first segment so that the logging sheet may be indexed just prior to a normal scanning interval to the next lower line on the first segment from any position on the logging sheet.

A further object of this invention is to provide an automatic process logging system which periodically scans and records in printed form the value of the process variables, and wherein a manual read-out means is provided wherein all points of the system may be recorded and conveniently located on the logging sheet at times occurring between the regular cyclic scanning intervals.

A preferred form of the invention which attains the aforementioned and other objects is disclosed in the specification to follow, taken in conjunction with the drawings wherein.

The advantages of the process logging system making up the invention revolve around the construction and arrangement of the logging sheet on which the process variable data is recorded and also about the construction of the automatic typewriter carriage which supports the logging sheet. Therefore, this portion of the logging system will be first described, for which reference is made to Figs. 1 and 2.

Figure 1:
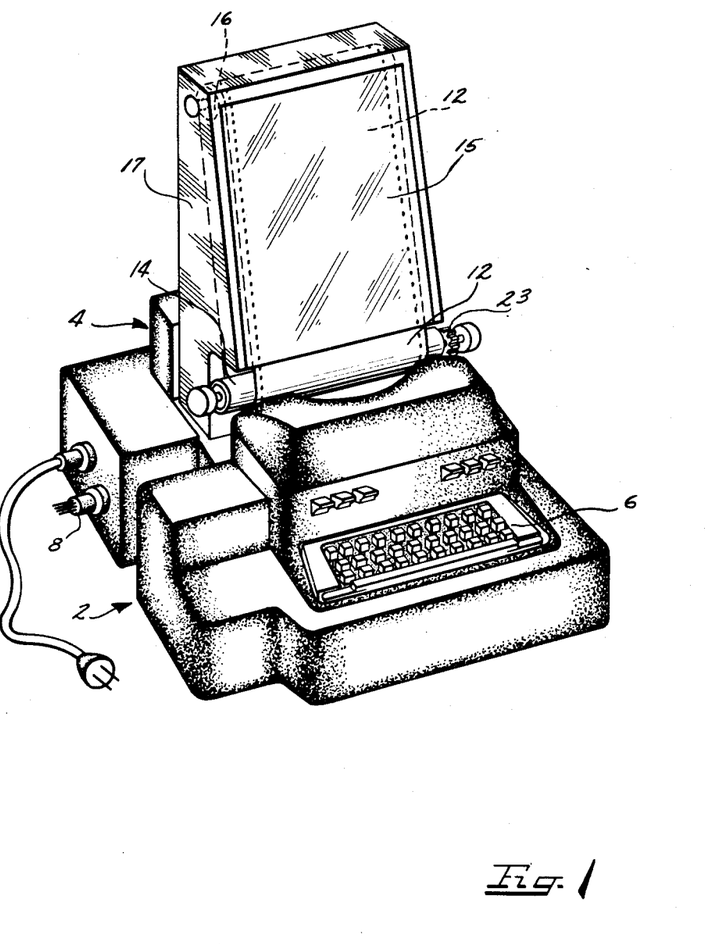
Fig. 1 is a perspective view of an automatic typewriter which has been modified according to the teachings of the present invention.
Figure 2:
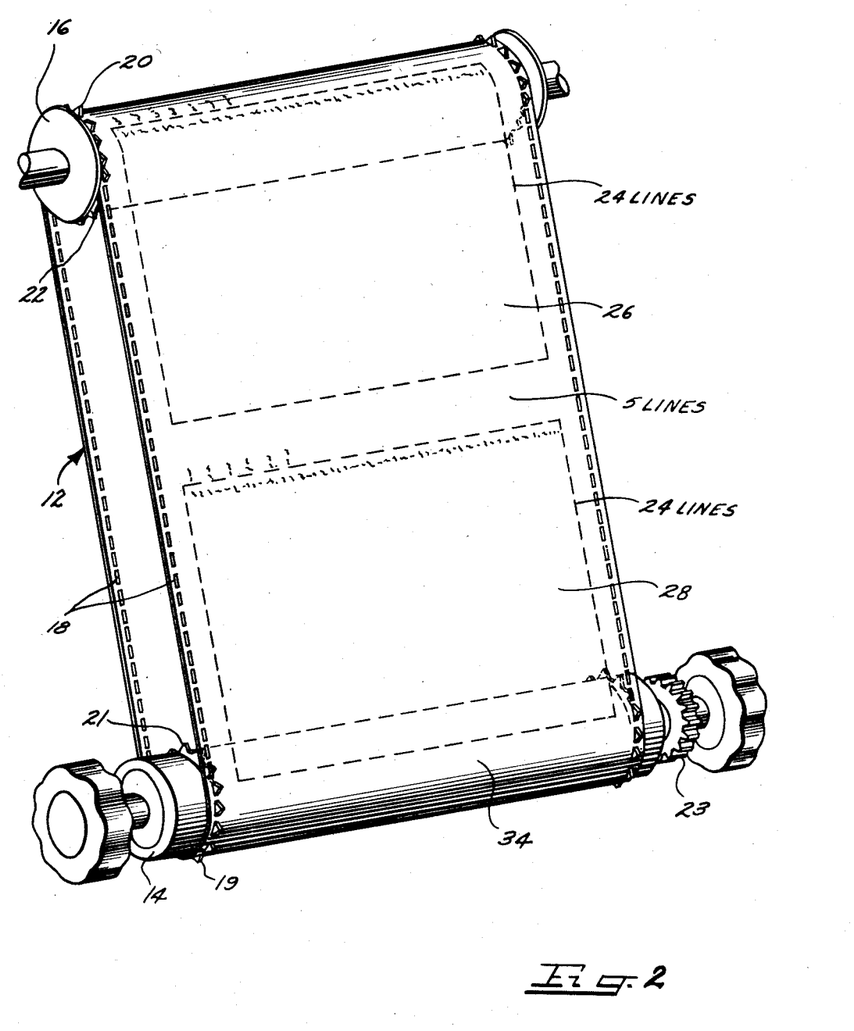
Fig. 2 is an enlarged perspective view of the logging sheet supported on the typewriter carriage of Fig. 1.

Except for the construction of the typewriter carriage 4, the automatic typewriter 2 illustrated in Figs. 1 and 2 may be of any suitable well known type as, for example, the automatic typewriter sold under the name of "Flexowriter," manufactured by the Commercial Controls Corporation. As is conventional in these typewriters, a keyboard 6 is provided for manual typing to permit an operator to add notations or headings to the logging sheet or chart. The process variable information obtained in the present invention is fed to the typewriter in the form of electrical signals fed through a cable 8 which includes five conductors representing a five-channel code, and other control lines, such as a red-ribbon shift control line which will be referred to later. Obviously, any other suitable code may be used.

The five conductors in the cable 8 may be energized in different combinations to represent the letters of the alphabet, numbers, punctuation marks, and line spacing directions. Of course, the typewriter includes suitable code-receiving and translating mechanism for actuating the keys of the typewriter automatically in response to the signals received by the typewriter.

A log sheet 12 on which the typewriter prints the received information is in the form of a continuous band or endless belt of paper which is supported in extended position on the typewriter carriage by means of a bottom carriage drive roll 14 and an upper carriage idler roll 16 supported in bearings in a sheet-supporting carriage housing 17. The housing 17 includes a front transparent window 15 through which approximately one-half to a full printed record is visible, since the window exposes almost a complete side of the logging sheet roll.

The log sheet is provided at its opposite edges with a series of equally spaced perforations 18 which receive the peripheral teeth 19—20 of lower and upper sprocket wheels 21 and 22. The drive roller 14 has a driver gear 23 which is coupled to suitable gearing (not shown) which drives the roller 14 during line spacing operations. A carriage return or shift magnet (not shown) in the typewriter moves the carriage to an indexing position and spaces the logging sheet one unit by effecting the rotation of the drive gear 23. Pulsing of one of the channels of the input cable 8 effects the energization of the carriage return or shift magnet to line space.

Figure 3:
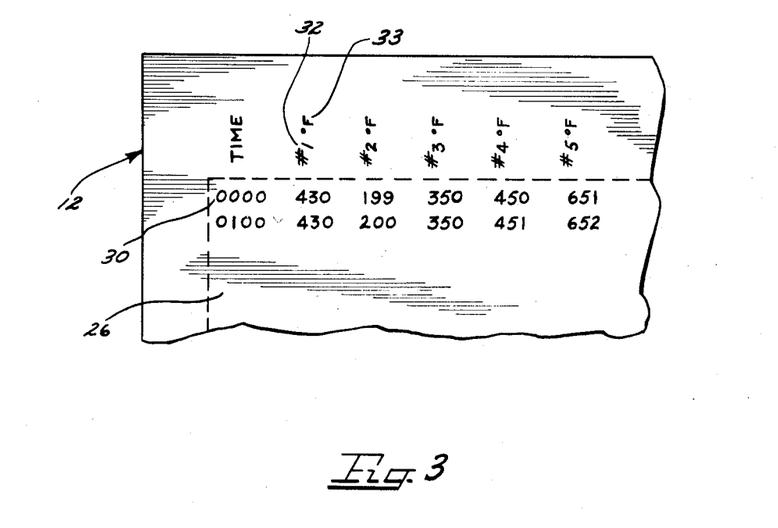
Fig. 3 is an enlarged fragmentary view of a portion of the logging sheet of Fig. 2.

The automatic typewriter 2 is controlled so as to record periodically, preferably hourly, the instantaneously scanned values of a large number of process variables in longitudinally spaced, rectangular, segmental areas 26 and 28. Each segmental area contains all the regularly recorded data for a given number of process variables which may be less than the total number scanned. In this case, the other process variables data is contained in other segmental areas, such as segment 28. Data on approximately fifty variables can be recorded in each line if standard typewriter carriages are utilized. Thus, for one hundred variables, two segments 26, 28 are needed; for two hundred, four segments are needed, etc. Printing time for one hundred variables (three digits in each variable) is approximately three minutes maximum. The time base represented in hours and minutes is typed automatically at the beginning of each line as at 30 (Fig. 3), with the hour indications progressively increasing proceeding down the respective segments. The logging sheet is reprinted with point numbers 32 and measurement units 33 at the top of each segment. Numerical data on the corresponding process variables are aligned in vertical rows in each segment under the corresponding process variable or point indication 32.

At the beginning of each hour, electrical signals representing the value of the various scanned process variables are sequentially fed to the typewriter 2 following the typing of the time indication 30 at the beginning of a line. The carriage 4 is then moved across the typewriter 2 in a conventional manner whereby measurements taken of the process variables are spaced horizontally along each line in the order in which they are scanned.

The datum at the end of any line in the first segment represents datum on the No. 50 process variable. Datum on the No. 51 process variable is then printed on the first datum line of the next segment which, in the sample log sheet illustrated in Fig. 2, is twenty-nine lines below the first line segment No. 1. Line spacing control means are provided for automatically pulsing the carriage shift magnet in the typewriter twenty-nine times following the printing of a line in the first segment, so that the logging sheet is positioned to receive information on the No. 51 plus subsequent process variables in the corresponding line of the next segment 28. During the time that the logging sheet is being indexed, means are provided to stop the scanning of the process variable so that the No. 51 process variable will not be skipped over before the log sheet is in position to receive datum on it. Following the printing of a line on the second segment 28, the logging sheet is similarly indexed to position subsequent segments to a printing position if more than two segments are utilized, or, where a line has been printed in the last segment, the aforementioned line spacing control means automatically indexes the typewriter the proper number of lines to position the logging sheet for receiving printing in the space 34 below the end of the last segment.

In the illustrated logging sheet, the segments are of the same size so that after the first line in the last segment 28 has been printed, the logging sheet is indexed at least twenty-four lines and in the illustrated example is indexed another five lines if no previous data has been previously recorded in the fifth line below the last segment 34. However, if other material has been previously recorded in this line, the log sheet must be indexed an additional amount to bring the logging sheet into a position just below the previously recorded data in this space. Line spacing control means is provided with suitable memory circuits for storing information as to the number of lines previously printed in the last segment 28 and also the number of lines which have been previously printed in the space 34, so that the logging sheet may be indexed to an unprinted line after printing in the last segment.

The space 34 below the last segment 28 is provided for automatic recording of abnormal process variable data occurring between the regularly hourly recording periods. This is important so that corrective action may be immediately taken when abnormal process variables occur and a suitable annunciator system is associated with the typewriter which brings the operator's attention to the logging sheet whenever an abnormal process variable is indicated. The space 34 may also be used for manual read-out of all process variables occurring between the regular hourly recording intervals. These data are recorded in the same manner as the corresponding data were recorded in the segments, except that the data at 34 are not segmentalized whereby that information occupies two adjacent lines in the logging sheet space 34 where one hundred variables are recorded. The logging system can be modified to print this manual read-out data in the sequential areas 26 and 28 but, in such case, more than twenty-four lines per segment are needed.

The abnormal data printed in the space 34 comprises a time indication 35 (see Fig. 4), a point identification number 36, an indication 37 of the value of the process variable, and the measurement units 38. Data on successively scanned abnormal process variables are printed one after the other until a full line is filled when the typewriter automatically indexes the logging sheet to receive printing on the subjacent line.

In order to pin point the location of abnormal readings on the logging sheet, all abnormal process variables, both in the segments and below the segments, are auomatically typed in red, while the normal readings are typed in black (although other color combinations could be used). Also, an audible alarm is sounded whenever a red off-normal reading is printed by the typewriter so that the attention of an operator is thus directed to the logging sheet.

Just prior to every regular hourly recording interval, the line spacing control means pulses the carriage shift magnet the proper number of times to bring the logging sheet to a position where the typewriter will type information immediately below the previously typed line in the upper segment 26. Since the number of lines occupied by the information typed below the bottom segment 28 varies, suitable means is provided for memorizing the location of the previous type line so that the logging sheet is automatically indexed to the proper position to begin a new hourly recording interval. The continuous belt construction of the logging sheet 12 permits the indexing of the logging sheet to this position by line spacing of the typewriter in the normal or forward direction.

Figure 5:
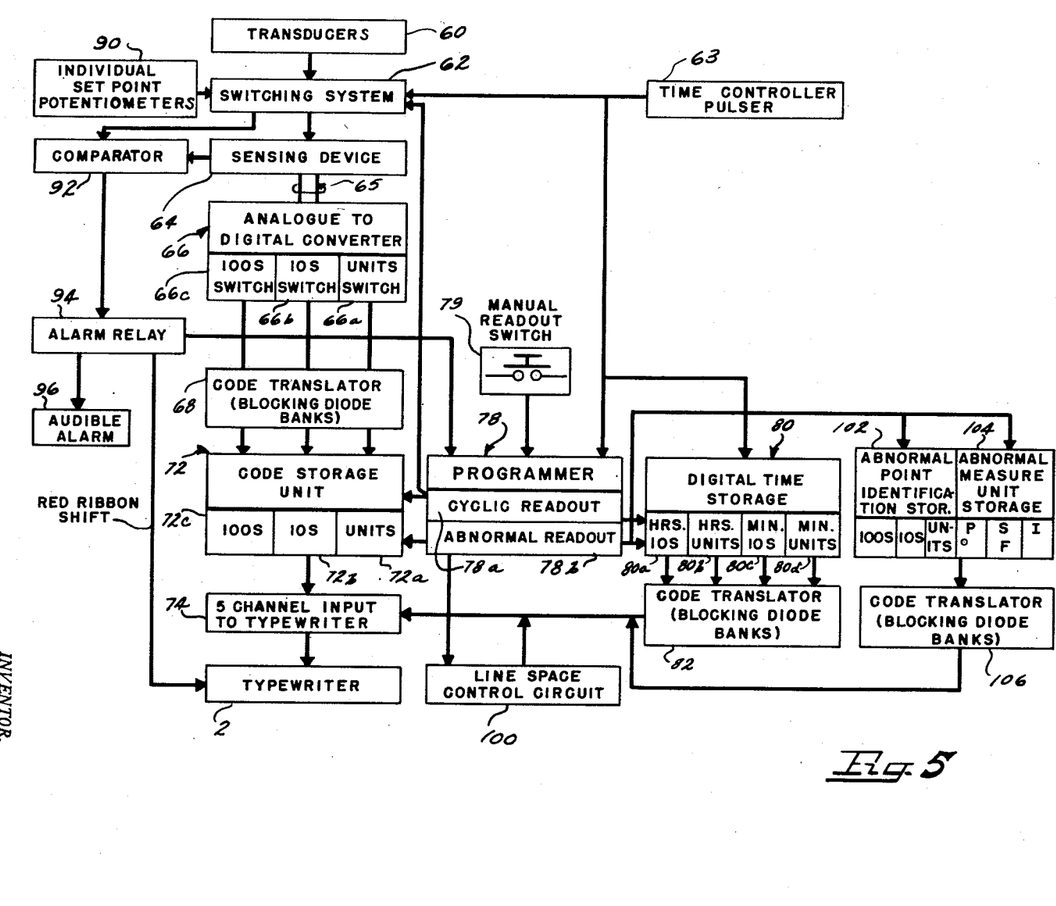
Fig. 5 is a block diagram of the control circuits which control the operation of the automatic typewriter.

Refer now to the simplified block diagram of Fig. 5 which outlines the various elements which control the operation of the electric typewriter 2. Box 60 represents a number of transducer elements, one for each process variable on which information is required. Each transducer produces a variable voltage, current, resistance, phase angle, etc. output which is a function of (preferably a linear function) the value of the associated process variable. In the case where temperatures are measured, the transducer elements may be thermocouples, or other temperature sensitive elements. Where other process variables relating to pressure or flow are involved, suitable well known transducers for converting measurements to voltages or other quantities which vary in a fixed relationship to the values of the process variables may be provided. The outputs of the various transducer elements are sequentially coupled by a scanner switching system 62 to a sensing device 64, which may be a null-balancing potentiometer where the transducers provide a variable magnitude voltage. The switching system 62 may comprise a number of stepping switches driven by a pulse timer 63. The pulse timer may comprise a synchronous motor and a number of cam operated switch contacts which interrupt electrical circuits to provide properly timed pulses for operating various parts of the system.

A null-balancing potentiometer provides a mechanical output in the form of a shaft movement, the angular position of which is a measure of the magnitude of the signal voltage fed to the sensing device. Thus, the angular position of the null-balancing potentiometer shaft 65 is a measure of the value of the process variable which is coupled to it at any particular instant by the switching system 62.

The output shaft motion of the sensing device 64 is fed to an analogue to digital converter 66 which converts the single shaft output of the sensing device to three separate shaft rotations representing respectively the three digits of a number representing the angular position of the shaft 65 which in turn represents the value of the process variable switched into the sensing device at that particular time. This is a well known type of digital converter of the electro-mechanical type. If desired, an electronic digital converter or other digital converter could be substituted for the electro-mechanical digital converter 66.

Electro-mechanical digital converters usually include three ten position switches represented by the reference numerals 66a, 66b and 66c, the wiper contacts of which connect with the contacts numbered 0-9 which represent the digits of a three digit number. The switches are positioned by three intermeshed gears or ratchet wheels having a ten to one step down ratio. If a transducer indicates, for example, that a process variable had a value of one hundred thirty four, the wiper contact of the ten position units switch 66a is positioned to the number four contact, the wiper contact of the ten switch 66b would be on the number three contact and the wiper arm of the hundred switch 66c would be on the number one contact. Suitable transfer voltages are applied to the wiper contacts of these switches in a manner to be described.

The different switch contacts of the digital converter switches are respectively coupled to hundreds, tens and units sections of a suitable code translator 68. Additional sections would be used, of course, with a four-digit number. The code translator 68 converts from a decimal indication to a five channel code indication. As is conventional in some types of code translators, each contact of the hundreds, tens and unit switches of the digital converter 66 is coupled through suitable groups of blocking diodes to one or more conductors of a five conductor code line, depending upon the particular five channel code used with the typewriter 2. Each switch of the digital converter is associated with a different five conductor code group representing the respective digits of a three digit number. In one five-channel code, for example, the digit zero is indicated by the energization of channels 2, 3 and 5. Accordingly, each of the zero contacts of the hundreds, tens and unit switches of the digital converter are connected through blocking diodes to channels 2, 3 and 5 leading respectively to the hundreds, tens and units register of a code storage unit 72.

The code storage unit is also a well known type of component which comprises banks of five self-holding relays in each of the storage registers 72a-c which, when energized, store information on the hundreds, tens and units digits, indicating the digital value of a process variable coupled to the sensing device at a particular moment. Each of the five relays in the hundreds, tens and units registers have respective contacts which lead to the five channel input 74 to the typewriter 2.

The information stored in code storage unit 72 is fed in the form of a voltage applied to one or more of the five input conductors in the typewriter input cable 8 when a transfer signal is fed sequentially to the hundreds, tens and units registers of the code storage unit 72 from a programmer 78. The programmer 78 is a device for controlling the kind and sequence of information fed to the typewriter. It may, for example, comprise various groups of stepping switches controlled by pulses from the pulse timer 63 at the appropriate time, and which, at the proper time, sequentially energize the hundreds, tens and units registers of the code storage unit 72 to transfer signal voltages through the closed storage relay contacts to the five channel input to the typewriter 2. The programmer 78 has two separate sections, namely, a cyclic read-out section 78a and an abnormal read-out section 78b. The cyclic read-out section 78a is automatically triggered into operation during the regular hourly scanning periods when all of the process variables are to be sequentially recorded in the logging sheet segments 26 and 28. The cyclic read-out section 78a may also be rendered active by closing of a manual read-out switch 79 during periods occurring between the normal hourly recording periods, for effecting the printing of data on all of the process variables scanned between the normal hourly recording periods. Although space could be provided in or between the logging sheet segments 26 and 28 for this purpose, it is preferred to record this information below the last log sheet segment 28.

The abnormal read-out section 78b of the programmer is autoamtically triggered into operation between the hourly scanning periods, and then only when abnormal process variables are being scanned. Information on the abnormal process variables are grouped together, preferably below the last logging sheet segment 28.

Information on the time of any particular reading is stored in a digital time storage unit 80 which has respective registers 80a-d for tens and units hours measurement and tens and units minutes measurement. These respective registers may comprise suitable interconnected stepping switches connected as a decade counter which are actuated by timing pulses from the time controller 63. The various 0-9 digit indicating contacts of the stepping switches of the registers 80a through 80d of the digital time storage unit 80 may be coupled through one or more blocking diodes making up the code translator 82 to the five channel input to the typewriter 2. The information stored in the tens and units registers and the hours and minutes switches 80a to 80d is sequentially transferred to the typewriter input under the control of the programmer, which feeds an energizing transfer voltage sequentially to the wiper contacts of the digital time storage stepping switches which in turn energize the proper channel or channels of the typewriter input by means of the code translator blocking diodes.

In typing the first line of logging sheet segment 26, for example, the cyclic read-out section 78a is triggered into operation each hour, whereupon a transfer voltage is sequentially fed to the hours tens, hours units, minutes tens, and minutes units register of the digital time storage unit 80 to feed, in sequence, the proper signal voltages to the typewriter input which will cause the typewriter to type the time indication at the beginning of the first line of the segment 26. Following this, the cycle read-out section 78a of the programmer sequentially scans the hundreds, tens and units register of the code storage unit 72 to effect feeding of the proper signals to the typewriter input which will type the digit indication of the process variable No. 1 at that time. The programmer section 78a then scans the storage unit 72 again to feed information to the typewriter which will print out the digit indication of the second process variable and this process repeats itself until the last process variable to be recorded in the first logging sheet segment 26 has been printed on the logging sheet. Then the cyclic read-out programmer sends a control signal to the switching system 62 to halt the scanning of the transducer 60 so that the logging sheet can be indexed twenty-nine lines to a position to receive information in the next segment by means of a line space control means 100, which sends the proper number of spacing pulses to the typewriter carriage shift relay. Following the indexing operation, the switching or scanning system 62 resumes operation, whereupon the cyclic read-out programmer section 78a again sends a transfer voltage successively to the time storage unit 80, and the code process variable measurement code storage unit 72 to print information on the next and succeeding process variable measurements.

As previously stated, whenever the sensing device 64 is coupled to a process variable which has an abnormal value, the typewriter 2 is to print the digital value of this abnormal process variable in a different color, namely red, than the normal or black color of the printing representing normal process variable values.

The circuit which carries out this function is indicated in block form at the left side of the detail block diagram of Fig. 5. It includes a number of individual set point potentiometers represented by box 90. There may be two individual set point potentiometers associated with each process variable so that abnormal process variable measurements which exceed any of two extreme values may be indicated in red on the typewriter logging sheet. The one or more set point potentiometers associated with the various process variables are sequentially fed through the switching circuit 62 to a comparator circuit 92 at the same time that the associated transducer 60 are fed by the switching system 62 to the sensing device 64. The voltage of the slide wire potentiometer of the null-balancing device 64 is compared in the comparator circuit 92 with the set point potentiometers of a particular process variable.

The comparator circuit 92 could, for example, comprise a suitable sensing amplifier with a relay in its plate circuit which is energized whenever the difference of the input voltages exceeds a given predetermined value. The relay in the plate circuit of this amplifier is indicated by box 94 and constitutes what is to be called an alarm relay. When the alarm relay 94 is energized, an audible alarm 96 is sounded and a relay in the typewriter 2, which may be referred to as a ribbon shift relay, is energized by a contact of the alarm relay to shift the typewriter ribbon into a position where the machine will type in red. The alarm relay 94 remains energized until the information on the process variable being measured at that moment is transferred to the typewriter logging sheet.

Following the printing of a complete line of information, on the last logging sheet segment 28, the line spacing control circuit 100 sends the proper number of line spacing pulses to the carriage shift relay of the typewriter so that the logging sheet is indexed preferably to a position to receive printing below the last logging sheet segment 28 where the machine remains on stand-by operation waiting for signals which indicate an abnormal condition or for manual read-out information. It can be appreciated that the number of positions which the logging sheet has to be indexed following the printing of a complete line on the second logging sheet segment 28 depends upon the line of that segment just printed as well as the position of the last complete printed line in the space below the last logging sheet segment 28. Accordingly, the line space control circuit 100 must be provided with an adding and subtracting memory circuit (which will be described later) so that the logging sheet can be indexed a number of lines equal to the number of lines between the first line of the last segment 28 and the first line to be printed below the last segment which is 30 minus the number of lines of the last segment printed plus the number of complete lines printed below the last segment 28.

The line spacing control circuit 100 additionally includes a means for sending twenty-nine pulses to index the logging sheet from one segment to another. The circuit also includes a memory circuit which counts the number of lines the logging sheet has been indexed since the printing of the last line in the first logging sheet segment 26. For example, assuming a chart containing two segments: for a twenty-four hour chart there would be twenty-four lines in each segment plus approximately five spaces or five lines between segments, plus five lines at the bottom of the second segment, plus approximately seventy lines or so going around the rear of the chart to the first line of the first segment. This makes a total of one hundred twenty-eight lines. The latter mentioned memory circuit would be capable of counting up to one hundred twenty-eight plus one and may comprise a three decade homing-type stepping switch arranged to store hundreds, tens and units and which is pulsed one count every time the carriage shift relay of the typewriter is pulsed once.

If the logging sheet is positioned to receive abnormal data in the space 34 below the logging sheet segments, say fifty-nine lines from the first line of the first logging sheet segment, then the latter memory circuit will be positioned to count position 59. Then, just prior to the regular hourly recording times, the memory circuit is continuously pulsed so as to home the decade count switches forming the memory circuit until count 129 is reached. Each time the homing switch is pulsed, the carriage shift relay in the typewirter is pulsed for line spacing purposes so that by the one hundred twenty-ninth count the logging sheet is positioned in the line of the first logging sheet segment below the previously typed line. A relay is automatically energized at the one hundred twenty-ninth count which stops the pulser which feeds the homing pulses and also homes all stepping switches not already homed so as to initiate another hourly recording cycle.

A more detailed block diagram description of the line space control circuit will be given later.

Thus far, all of the basic components by which the process variables are actually printed on the various segments of the logging sheet and also the method of line spacing have been explained. The additional components necessary to print out information on abnormal conditions below the last segment (or between the segments when this system is used) will now be described.

As previously stated, in the intervals between the regular hourly recording periods, the transducer elements 60 are continuously scanned by the switching system 62 and the electrical sensing device output is continuously fed to the comparator 92 so that the system is continuously hunting for abnormal process variables. Whenever an abnormal process variable exists, the alarm relay 94 is energized as above explained, the audible alarm 96 is sounded, and a red ribbon shift relay of the typewriter 2 is energized so that the typewriter will print in red. The energization of the alarm relay 94 also triggers the abnormal read-out programmer section 78b if the cyclic read-out programmer section 58a has not already been placed into operation. Otherwise, the alarm relay has no effect on the abnormal read-out sections 78b.

The abnormal read-out programmer section 78b scans a digital time storage unit 80 to transfer time information 35 (see Fig. 4) to the typewriter input after which time this programmer section feeds a transfer voltage sequentially to the abnormal point identification storage unit 102 and the abnormal measuring unit storage device 104. As in the digital time storage unit 80, the respective stepping switch position indicates the type of information stored therein.

Since the information on abnormal process variables typed below the last logging sheet segment is not presented in the columns corresponding with the point indicating columns in the logging sheet segments, it is necessary to indicate the particular process variable or test point as a digit number and also, for convenience, the units (degrees Fahrenheit, pounds per square inch, etc.) of the process variable. The abnormal point identification storage unit 102 has hundreds, tens and units sections formed by decade stepping switches which are pulsed in synchronism with the switching system 62 so that the abnormal point identification storage unit 102 always indicates the identification of the process variable or test point which is scanned at any particular instant.

Figure 4:
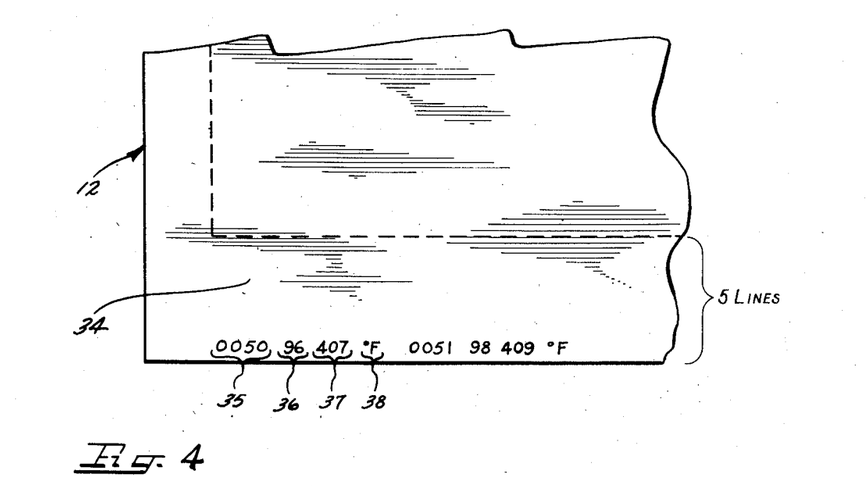
Fig. 4 is an enlarged fragmentary view of another portion of the logging sheet.

An abnormal measurement unit storage device 104 is provided which stores information of the units of the process variable being scanned at any particular time (by units is meant degrees Fahrenheit, pounds per square inch, etc.). The various contacts of the stepping switches of the storage units 102 and 104 are connected to a code translator 106 which is similar to the code translators previously described. The programmer section 78b sequentially applies a transfer voltage to the abnormal point identification storage unit 102 which transfers the proper digital information of the number 36 (Fig. 4) of the process variable or test point to the typewriter input. Next the programmer 78 sequentially feeds a transfer voltage to the hundreds, tens and units register of the measurement code storage unit 72 which transfers digital information to the typewriter of the value of the abnormal process variable; then the programmer section 78b sequentially feeds a transfer voltage to the various registers of the abnormal measurement unit storage device 104 which transfers proper signals through the code translator 106 which will print out the units of measurement 37 and 38 (Fig. 4). Following the printing of the abnormal data, the alarm relay becomes unenergized and the abnormal read-out programmer section 78b is thereby rendered inoperative so that further information is not sent to the typewriter for printing until a subsequent abnormal condition is scanned by the switching system 62.

If manual read-out information is desired in the space 34 beneath the last logging sheet segment, the manual reset switch 79 is depressed which actuates the cyclic read-out program section 78a so that information on all of the process variables for a time between the normal recording times may be obtained on demand.

Figure 6:
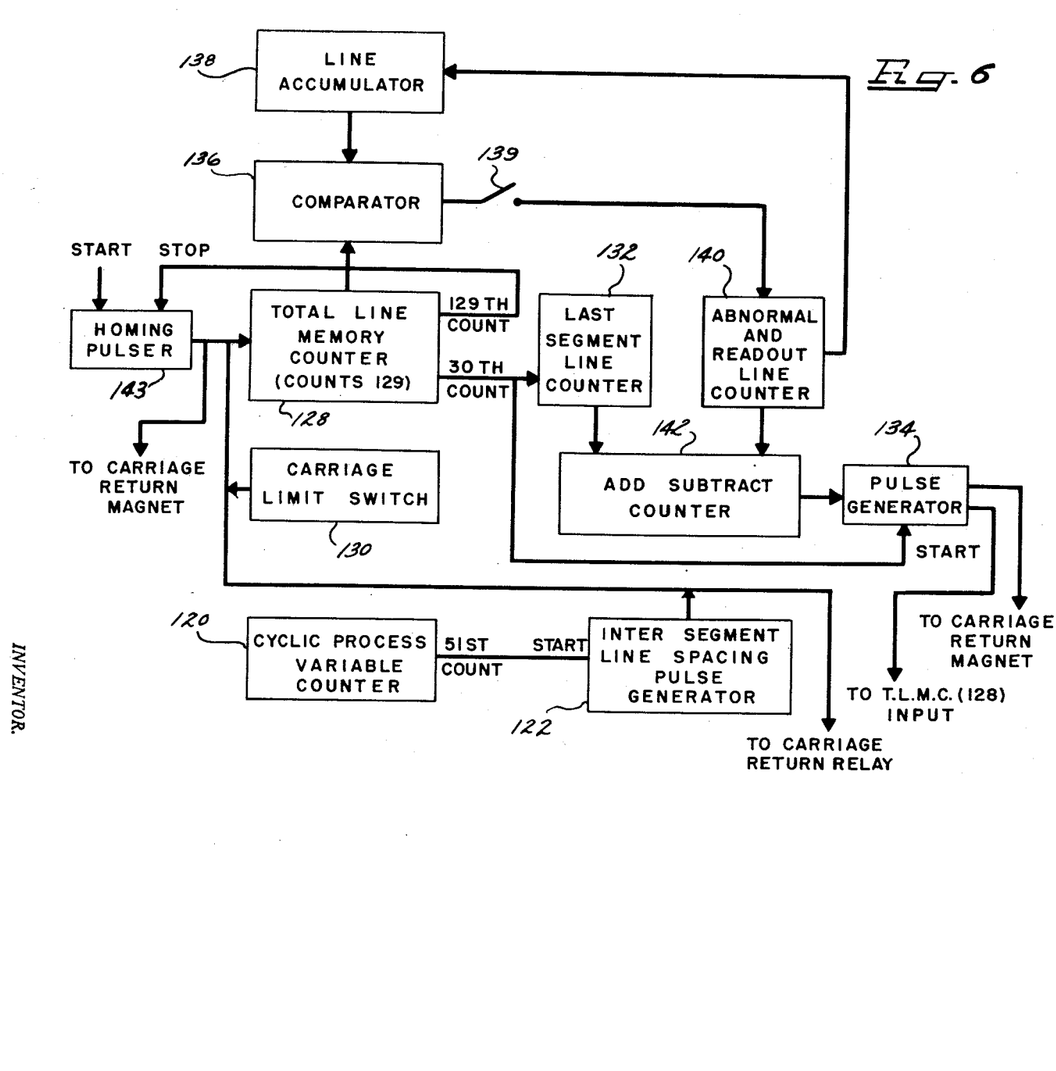
Fig. 6 is a detailed block diagram of the line spacing control means of Fig. 5.

Refer now to Fig. 6 showing a detailed box diagram of the various elements making up the line spacing control circuit 100 in Fig. 5. To review the line spacing problem previously considered, the following line spacing operations must be automatically performed by the line spacing control means:

(1) The logging sheet must be indexed twenty-nine lines following the typing of a line in the first segment or, if more than two segments are used, after the typing of a line in all but the last segment.

(2) Following the typing of a line in the last segment, the logging sheet must be indexed so as to position the logging sheet for printing abnormal or manual read-out data in a line subjacent to the last printed line in the space 34 below the last logging sheet segment. As previously indicated, to accomplish this result the logging sheet must be indexed a number of lines equal to the quantity thirty minus the number of lines printed in the last segment plus the number of lines printed in the space 34 (this, of course, assumes that the first printed line in the space 34 occurs five line spaces below the last segment).

(3) Just prior to the regular hourly recording intervals, the logging sheet must be indexed into a position such that the first hourly process data recorded is printed in the next line below the last printed line of the first segment.

In order to index the logging sheet twenty-nine lines following the typing of any complete line in the first segment, a cyclic process variable counter 120 is provided which counts the number of process variable data positions which have been printed in the logging sheet segments during each regular hourly recording interval. The counter may be any suitable mechanical or electronic counter driven by signals fed either from the switching system 62 or from the cyclic programmer section 78a. At the beginning of each hourly recording interval, the counter 120 must, of course, be reset to zero count position. When the counter 120 indicates the beginning of the fifty-first count, which occurs when the fiftieth process variable has been recorded on a line of the first segment, a suitable pulse generator 122 is triggered into generating twenty-nine pulses which are fed to the carriage return or line shift magnet, which line spaces the typewriter twenty-nine times. The twenty-nine pulses at the output of the pulse generator 122 are also fed to the input of a total line memory unit 128 which may be a stepping switch counter having a maximum count position of one hundred twenty-nine, which is equal to the total number of lines around the logging sheet plus one. This counter is reset to zero just before the start of an hourly recording interval.

One of the functions of the total line memory counter is to keep track of the number of lines the logging sheet has been indexed from the last printed line in the first logging sheet segment. A carriage limit switch indicated by the reference numeral 130, which switch may be a microswitch which is tripped by the carriage of the typewriter when the carriage reaches the end of its travel, is secured to the automatic typewriter so that a pulse is fed to the input of the total line memory counter every time the end of a printed line is reached. If line spacing occurs prior to the end of a line, then the proper number of pulses must be fed to the total line memory counter from other sources, such as the aforementioned twenty-nine pulses fed from the pulse generator 122. (Of course, where a segment contains a full line of printed matter, the first of the twenty-nine pulses is superfluous since the carriage limit switch also feeds a pulse in synchronism therewith.)

The total line memory counter also receives pulses from another pulse generator, to be described, which controls the number of lines the logging sheet is indexed following the printing of a line in the last segment.

In the case where only two segments are utilized, the completion of the printing of the last line of the second segment is indicated when the total line memory counter has accumulated a count of thirty therein. Accordingly, the number of lines printed in the second last segment may be indicated by accumulating or counting the number of times in a day the total line memory counter had reached the thirtieth count. Accordingly, a last segment line counter 132 is coupled with the total line memory counter 128 so that a pulse is received each time the total line memory counter reaches the thirtieth count. This function is easily obtained by the use of stepping switches and control relays, although electronic counters could also be utilized.

If the logging sheet had three segments, then the last segment line counter 132 would indicate a number of printed lines in the last segment if the memory counter 128 would feed a pulse thereto each fifty-eighth count. Obviously, the last segment line counter 132 is reset to zero only once every twenty-four hours.

Since the pulse input to the last segment line counter 132 occurs on the completion of the printing of the last line in the last segment, this pulse may also be utilized to trigger a circuit which properly spaces the logging sheet to a line in the logging sheet space 34 which is just below the last printed line therein. Accordingly, the thirtieth line count pulse of the total line memory counter is also fed to a pulse generator 134 as a triggering pulse to initiate its operation. The pulse generator 134 then provides a number of pulses equal to thirty minus the accumulated count in the last segment line counter 132, plus the number of lines which have been printed or occupied in the abnormal and manual read-out space 34 of the logging sheet.

In order to count the number of lines printed in the space 34, a line accumulator unit 138 is provided which may consist of a stepping switch or other type counter which is similar to the total line memory counter 128 except that it accumulates counts from a reference position of fifty-nine rather than zero, and its maximum count range is one hundred and twenty-eight. Also, it is reset to the fifty-ninth count position only once each day. Every time a new line is printed in the abnormal and read-out space 34 of the logging sheet, the accumulator unit 138 steps up one count.

A count comparator unit 136, which may comprise a series of stepping switches and relays arranged in a manner well known in the art, is provided which compares the count positions of the accumulator 138 and the total line memory counter 128. Whenever they coincide, a pulse is sent to a normally closed switch 139 which, when closed, couples the pulse to an abnormal and read-out line counter 140. The pulse steps the counter 140 one count to indicate the printing of a line in the logging sheet space 34. The latter counter 140 accumulates counts from zero count position at the beginning of each new twenty-four hour period and indicates the number of lines printed in the logging sheet space at any given time during such period.

As a count pulse is fed to the abnormal and read-out line counter 140, it in turn pulses the line accumulator 138 to advance it one count.

The pulses fed to the abnormal and read-out line counter 140 from the comparator unit 136 are halted during the time that the logging sheet is "homed" or returned to a position to receive printing in the first segment of the logging sheet at or just before the beginning of a regular hourly recording interval. The switch 139 between the output of the comparator unit 136 and the input to the abnormal and read-out line counter is opened during the "homing" interval when no printing is taking place in the logging sheet space 34.

It can be seen that with this arrangement, the total count accumulated in the abnormal and read-out line counter 140 is a measure of the number of lines printed in the logging sheet space 34.

The output of the last segment line counter 132 and the line counter 140 is fed to an add and subtract counter 142. The add and subtract counter 142 may comprise a series of stepping switches which add and subtract from a thirty count switch position, thereby performing the aforementioned computation necessary to determine the number of lines which the logging sheet must be indexed after a printing in the last logging sheet segment. The counter 142 is, of course, reset to its thirty count reference position only once daily.

The pulse generator 134, which may also include a series of suitable stepping switches and control relay circuits, is connected with the add-subtract counter 142 so that when the pulse generator is triggered into operation by the thirtieth line count pulse originating from the total line memory counter 128, it will cause the pulse generator to generate a number of pulses equal to the count stored in the add-subtract counter 142. The output pulses of the pulse generator 134 are, of course, fed to the carriage return magnet which line spaces and also to the input of the total line memory counter so that this counter will indicate the total number of lines traversed since the printing of the last line in the first logging sheet segment.

The total line memory counter performs an additional important function of aiding in the automatic positioning or homing of the logging sheet to a position where the typewriter will print regularly hourly recorded data in the line of the first segment just below the last printed line. Thus, just prior to the beginning of a regular hourly recording cycle, a homing pulser 143 is triggered into operation and the pulses of the homing pulses 143 are fed to the input of the total line memory counter. The pulses are continuously fed to the latter counter until it has reached its maximum count of one hundred twenty-nine. Upon reaching the one hundred and twenty-ninth count, a stop pulse is fed from the total line memory counter 128 to the homing pulse 143 which causes the pulser to cease operation, and also returns the counter 128 to its zero count position. The output of the homing pulser 143 is also fed to the carriage return magnet so that the logging sheet is spaced a number of times equal to the difference between the number 129 and the count accumulated in the total line memory counter prior to its receiving homing pulses from the pulser 143. Thus, the logging sheet is automatically positioned so as to receive print in a line in the first segment subjacent to the last printed line therein.

It should be understood that numerous modifications may be made of the described embodiment of the invention without deviating from the broader aspects of this invention. For example, the abnormal or manual read-out information could be printed in the space between the hourly scanned data contained in the spaced segmental areas of the logging sheet rather than at the end of the segments, although the latter is preferred.

The present invention has thus provided an automatic logging system using an automatic typewriter as a data recorder, and wherein the data is typed on a continuous band logging sheet which is segmentalized to accommodate data for a large number of process variables. Abnormal data can be quickly located by its red color. Further, all abnormal variable data occurring between the regular hourly recording intervals are automatically recorded and grouped together. Further, memory units are utilized to control the line spacing of the logging sheet so that different kinds of data which are received at different times are typed in their proper places on the logging sheet.

In the claims to follow, the term "variables" should be broadly interpreted to include, for example, such variables as process variables (i. e. variables of chemical or other processes such as temperatures, pressures, flows, etc. of various parts of a process) or the physical or electrical variables of machinery, electrical circuits, etc., such as are found, for example, in electrical power plants and the like.

Also, the term "scanning interval" as used in the claims should be interpreted to mean a time interval in which a group of variables is scanned once.

I claim:

1. In a logging system having scanning means for repeatedly scanning a large number of variables, an automatic typewriter to record data on the variables, and control means for sequentially feeding the scanned data into the typewriter for printing, the improvement comprising support means on the carriage of the typewriter for supporting a continuous belt logging sheet on which the variable data are to be printed, means for indexing the logging sheet lengthwise thereof in a fixed predetermined manner from one segmental area thereof to another segmental area during a scanning interval so that data on a number of variables greater than the number that can be accommodated by the width of the logging sheet may be recorded along the width of the logging sheet in longitudinally spaced segmental areas of the sheet, and means for automatically returning the logging sheet from the latter segmental area to the former segmental area so that recorded data for a subsequent scanning interval are recorded opposite the data of the corresponding variables.

2. In a logging system having a scanning means for repeatedly scanning a large number of variables, an automatic typewriter to record data on the variables, and control means for sequentially feeding the scanned data into the typewriter for printing, the improvement comprising support means on the carriage of the typewriter for supporting a continuous belt logging sheet on which the variable data are to be printed, means for indexing the logging sheet lengthwise thereof in a given direction from one segmental area thereof to another segmental area during a scanning interval so that data on a number of variables greater than the number that can be accommodated by the width of the logging sheet may be recorded along the width of the logging sheet in longitudinally spaced segmental areas of the sheet, and means for automatically returning the logging sheet from the latter segmental area to the former segmental area by indexing said logging sheet in said direction so that recorded data for a subsequent scanning interval may be recorded opposite the data of the corresponding variables without reversing the indexing direction of the logging sheet.

3. In a logging system having scanning means for repeatedly scanning a large number of variables, an automatic typewriter to record data on the variables, and control means for sequentially feeding the scanned data into the typewriter for printing, the improvement comprising support means on the carriage of the typewriter for supporting a continuous belt logging sheet on which the data are to be printed in a position where an operator may view a substantial portion of the previously recorded data, means for indexing the logging sheet in a fixed predetermined manner from one segmental area thereof to another segmental area during a scanning interval so that data on a number of variables which is greater than the number that can be accommodated by the width of the logging sheet may be recorded along the width of the logging sheet in longitudinally displaced segmental areas of the sheet, and means for automatically returning the logging sheet from the latter segmental area to the former segmental area so that recorded data for subsequent scanning intervals are recorded opposite the data of the corresponding variables.

4. A logging system having scanning means for continuously scanning a large number of variables, a typewriter for recording said variables, means for feeding information on the scanned variables to said typewriter for printing during spaced time intervals and for causing the typewriter to print said information on one portion of a logging sheet, means for automatically indexing said logging sheet between said recording intervals to a position where the logging sheet may receive printing in a different portion of the logging sheet, means coupled to said scanning means for feeding data on only abnormal variables to said typewriter for printing between said spaced recording intervals and for causing the typewriter to print this data in said latter logging sheet portion, and means for automatically indexing said logging sheet just prior to said recording intervals to a position where the logging sheet will receive printing in said first-mentioned logging sheet portion.

5. In a logging system having scanning means for repeatedly scanning a large number of variables, an automatic typewriter to record data on the variables, and control means for sequentially feeding the scanned data into the typewriter for printing during spaced time intervals, the improvement comprising support means on the carriage of the typewriter for supporting a continuous belt logging sheet on which the variable data are to be printed, means for indexing the logging sheet lengthwise thereof in a fixed predetermined manner from one segmental area thereof to another segmental area during a scanning interval so that data on a number of variables greater than the number that can be accommodated by the width of the logging sheet may be recorded along the width of the logging sheet in longitudinally spaced segmental areas of the sheet, means for indexing the logging sheet between the regular recording intervals to a space below said other segmental area in which said regular recorded data is printed, means for printing variable data in said latter space in the time between regular recording intervals, means for counting the number of lines printed in said other segmental area, means for counting the number of lines printed in the space below said other segmental area, and means responsive to the accumulated count in said counters for indexing the logging sheet prior to the beginning of a regular recording interval into a position to receive printing immediately below the last printed line in the first-mentioned segmental area.

6. A logging system having scanning means for continuously scanning a large number of variables, a typewriter for recording said variables, means for automatically feeding information on the scanned variables to said typewriter for printing during regular spaced time intervals and for causing the typewriter to print said information on one portion of a logging sheet, means for automatically indexing said logging sheet between said recording intervals to a position where the logging sheet may receive printing in a different portion of the logging sheet, and manual read-out means for feeding data, on demand, of the scanned variables to said typewriter between said spaced recording intervals and for causing the typewriter to print this data in said latter logging sheet portion, and means for automatically indexing said logging sheet just prior to said recording intervals to a position where the logging sheet will receive printing in said first-mentioned logging sheet portion.

7. In logging apparatus including an automatic typewriter for printing the data on variables on a logging sheet carried thereby, scanning means for repeatedly scanning the variables in a predetermined manner, and typewriter control means for causing said typewriter during regular spaced time intervals to print sequentially values of the variables existing during the regular scannings in a predetermined space provided on said logging sheet for this purpose, manually operable read-out means for causing the typewriter to print data on all of the variables between said regular spaced time intervals, line spacing control means for automatically causing the typewriter to print said latter data in a space on said logging sheet outside of said first-mentioned space, memory means for memorizing the location of the last time line printed on said logging sheet for the regularly recorded data, and means responsive to said memory means for automatically indexing said logging sheet to said next time line in said first-mentioned space prior to the beginning of the next regular recording interval.

8. In a logging system utilizing an automatic typewriter having a log sheet supporting carriage, means for indexing the logging sheet for line spacing purposes, signal-receiving means, and typewriter actuating means for actuating the typewriter to print the desired characters on a logging sheet in response to the signals received by said signal-receiving means, data transmitting means including means for periodically and automatically scanning each of a number of variables and means for feeding data on said variables during regular, spaced, recording intervals to said signal receiving means, the improvement comprising a logging sheet on said carriage having a predetermined space set aside for said data obtained during the regular recording intervals, said data transmitting means including means for feeding data of variables to said signal-receiving means between said regular recording intervals and means for directing said logging sheet indexing means to index automatically the logging sheet to a type-receiving line which is located outside of said predetermined space thereon to receive said latter data, memory means for remembering the line position of said logging sheet on which data was previously recorded during a regular recording interval, and means responsive to said memory means prior to a regular recording interval for automatically operating said line indexing means to position said logging sheet to receive the regularly recorded data adjacent to said latter line.

9. In a logging system utilizing an automatic typewriter having a logging sheet-supporting carriage, signal-receiving means, and typewriter actuating means for actuating the typewriter to print the desired characters on a logging sheet in response to the information received by said signal-receiving means, the improvement comprising a logging sheet in the form of a continuous belt supported on said carriage in a position such that an operator may view previously tabulated data at all times, a driven roller and an idler roller, one above the other, on said carriage for supporting the logging sheet in a distended position, line-spacing means for advancing said driven roller to advance the logging sheet in a given direction for line spacing purposes, information transmitting means including means for continuously sequentially scanning each of a number of variables and means for feeding data on the scanned variables to said signal-receiving means during regular, spaced, recording intervals whereby said data is periodically recorded, said logging sheet having a predetermined space set aside for said information obtained during the regular recording intervals, said information transmitting means including means for feeding information on abnormal values of variables to said signal-receiving means between regular recording intervals and for directing said logging sheet line spacing means to index automatically the logging sheet to a type-receiving line which is located outside of said predetermined space thereon to group the abnormal variables together outside of said predetermined space, memory means for remembering the line position of said logging sheet on which data was recorded during the previous regular recording interval and means responsive to said memory means prior to the beginning of each recording interval for operating said line spacing means to advance said logging sheet in said direction to a position to receive the regularly recorded information adjacent to said latter data.

10. In combination with a number of measuring means for measuring respectively the values of a number of process or other variables, logging apparatus for automatically recording the values of the variables measured by said measuring means, said logging apparatus including an automatic typewriter, typewriter control means for causing the typewriter to print sequentially the values of the process variables on a logging sheet, means for automatically and sequentially connecting the outputs of said respective measuring means to said typewriter control means, means for changing from one color typing to another, fault sensing means coupled to said measuring means for actuating said typing color changing means to cause the typing of data on abnormal values of the variables in one color and the normal values of the variables in another color, and audible alarm means for giving an audible alarm when abnormal variable data is detected.

11. In combination with a number of measuring means for measuring respectively the values of a number of process or other variables, logging apparatus for automatically recording the values of the variables measured by said measuring means, said logging apparatus including an automatic typewriter, typewriter control means for causing the typewriter to print sequentially the values of the process variables on a logging sheet, means for automatically and sequentially connecting the outputs of said respective measuring means to said typewriter control means, means for changing from one color typing to another, and fault sensing means responsive to said measuring means for actuating said typing color changing means to cause the typing of data on abnormal values of the variables in one color and the normal values of the variables in another color.

12. In a logging system having means for repeatedly scanning a number of variables, an automatic typewriter for recording data appertaining to said scanned variables, and means coupling said scanning means with said typewriter for causing the typewriter to print values of said variables, the improvement comprising means for supporting a continuous belt logging sheet on the carriage of said typewriter, means for actuating the typewriter to print said scanned data across one portion of a logging sheet belt on said belt supporting means and then to index the logging sheet a number of lines in one direction to bring another portion of the logging sheet into printing position of the typewriter, line counting means for counting the number of lines that the logging sheet was indexed since the last printed line in said one logging sheet portion, said line counting means being adapted to accumulate a count which is a function of the number of lines extending around the continuous belt logging sheet and the number of lines from the last printed line in said one logging sheet portion it is desired to space the next printed line therein, and means for automatically returning said logging sheet from said other to said one logging sheet portion including means for homing said counting means to said count position and for indexing the logging sheet in the same given direction a number of spaces which is a function of the number of counts necessary to home said counting means.

13. In a logging system having scanning means for repeatedly scanning a large number of variables, an automatic typewriter to record data on the variables, and control means for sequentially feeding the scanned data into the typewriter for printing during spaced time intervals, the improvement comprising support means on the carriage of the typewriter for supporting a continuous belt logging sheet on which the variable data are to be printed, means for indexing the logging sheet lengthwise thereof in a fixed predetermined manner from one segmental area thereof to another segmental area during a scanning interval so that data on a number of variables greater than the number that can be accommodated by the width of the logging sheet may be recorded along the width of the logging sheet in longitudinally spaced segmental areas of the sheet, means for indexing the logging sheet between the regular recording intervals to a space below said other segmntal area in which said regular recorded data is printed, means for printing variable data in said latter space in the time between regular recording intervals, means for counting the number of lines printed in said other segmental area, means for counting the number of lines printed in the space below said other segmental area, and means responsive to the accumulated count in said counters for indexing the logging sheet prior to the beginning of a regular recording interval into a position to receive printing in the first-mentioned segmental area.

14. In combination with a number of measuring means for measuring respectively the values of a number of process or other variables, logging apparatus for automatically recording the values of the variables measured by said measuring means, said logging apparatus including an automatic typewriter, typewriter control means for causing the typewriter to print sequentially the values of the process variables on a logging sheet, means for sequentially and automatically connecting the outputs of said respective measuring means to said typewriter control means, print distinguishing means for providing a distinguishing indication to at least a part of the printing associated with the data on an abnormal variable, and fault sensing means responsive to said measuring means for actuating said print distinguishing means to cause the typing of data on an abnormal variable with a distinguishing characteristic.

15. In combination with a number of measuring means for measuring respectively the values of a number of process or other variables, logging apparatus for automatically recording the values of the variables measured by said measuring means, said logging apparatus including an automatic typewriter, typewriter control means for causing the typewriter to print sequentially the values of the process variables on a logging sheet, means for sequentially and automatically connecting the outputs of said respective measuring means to said typewriter control means, print distinguishing means for providing a distinguishing indication to at least a part of the printing associated with the data on an abnormal variable, fault sensing means responsive to said measuring means for actuating said print distinguishing means to cause the typing of data on an abnormal variable with a distinguishing characteristic, and annunciator means connected for operation upon the existence of an abnormal variable to attract an attendant's attention to the logging sheet of the typewriter.

16. In a logging system having a scanning means for repeatedly scanning a large number of variables, an automatic typewriter to record data on the variables, control means for sequentially feeding scanned data on substantially all scanned variables into the typewriter for printing during spaced scanning intervals, and a support means on the carriage of the typewriter for supporting a logging sheet on which the variable data are to be printed, means for indexing said logging sheet lengthwise thereof from one segmental area to another segmental area thereof during each of said spaced scanning intervals and following the printing of a number of variables less than the number scanned during said scanning interval, and means for automatically returning the logging sheet from the latter segmental area to the former segmental area prior to the initiation of a new one of said scanning intervals so that data for said new scanning interval are recorded opposite the previously recorded data of the corresponding variables.

17. In a logging system having a scanning means for repeatedly scanning a large number of variables, an automatic typewriter to record data on the variables, control means for sequentially feeding the scanned data into the typewriter for printing, and support means on the carriage of the typewriter for supporting a logging sheet on which the data are to be printed, means for indexing said logging sheet a fixed number of lines lengthwise thereof sufficient to accommodate data on a given number of variables over a given time period, when a line is completed before the completion of the recording of a given amount of data which a line on said logging sheet cannot accommodate, whereby said logging sheet is indexed from one segmental area to another segmental area thereof between the initiation of spaced scanning intervals, and means for automatically returning the logging sheet from said latter segmental area to a line below the last printed line in said former segmental area prior to the initiation of a new scanning interval so that data for said new scanning interval are recorded in said former segmental area.

18. In a logging system having scanning means for repeatedly scanning a large number of variables, an automatic typewriter to record data on the variables, and control means for sequentially feeding the scanned data into the typewriter for printing during regular spaced time intervals, the improvement comprising support means on the carriage of the typewriter for supporting a logging sheet on which the variable data are to be printed, means for indexing the logging sheet lengthwise thereof in a fixed predetermined manner from one segmental area thereof to another segmental area during a scanning interval so that data on a number of variables greater than the number that can be accommodated by the width of the logging sheet may be recorded along the width of the logging sheet in longitudinally spaced segmental areas of the sheet, means for indexing the logging sheet between the regular recording intervals to a space below said other segmental area in which said regular recorded data is printed, means for printing variable data in said latter space in the time between regular recording intervals, means for counting the number of lines printed in said other segmental area, means for counting the number of lines printed in the space below said other segmental area, and means responsive to the accumulated count in said counters for indexing the logging sheet prior to the beginning of a regular recording interval into a position to receive printing immediately below the last printed line in the first-mentioned segmental area.

19. In a logging system utilizing an automatic typewriter having a log sheet supporting carriage, means for indexing the logging sheet for line spacing purposes, signal-receiving means, typewriter actuating means for actuating the typewriter to print the desired characters on a logging sheet in response to the signals received by said signal-receiving means, and data transmitting means including means for periodically and automatically scanning each of a number of variables and means for feeding data on said variables during regular, spaced, recording intervals to said signal receiving means, the improvement comprising a logging sheet on said carriage having a predetermined space set aside for said data obtained during the regular recording intervals, said data transmitting means including means for feeding data of variables to said signal-receiving means between said regular recording intervals and means for directing said logging sheet indexing means to index automatically the logging sheet to a type-receiving line which is located outside of said predetermined space thereon to receive said latter data, and means for automatically operating said line indexing means prior to a regular recording interval to position said logging sheet to receive the regularly recorded data in said predetermined space set aside therefor.

20. In a logging system having means for repeatedly scanning a number of variables, an automatic typewriter for recording data on said variables and having a logging sheet supporting carriage, signal receiving means coupled to said scanning means, and typewriter actuating means for actuating the typewriter to print desired characters on a logging sheet in response to the information received by said signal receiving means, a logging sheet in the form of a continuous belt, means supporting said logging sheet in distended position on said carriage so that an operator may view substantially one-half of the logging sheet, and means for indexing said logging sheet from one segmental area to another segmental area thereof between the initiation of spaced scanning intervals and for automatically returning the logging sheet from the latter segmental area to the former segmental area prior to the initiation of a new scanning interval.

21. In a logging system having scanning means for repeatedly scanning a large number of variables, an automatic typewriter to record data on the variables, and control means for sequentially feeding the scanned data into the typewriter for printing, the improvement comprising support means on the carriage of the typewriter for supporting a logging sheet on which the variable data are to be printed, means for indexing the logging sheet lengthwise thereof in a fixed predetermined manner from one segmental area thereof to another segmental area during a scanning interval so that data on a number of variables greater than the number that can be accommodated by the width of the logging sheet may be recorded along the width of the logging sheet in longitudinally spaced segmental areas of the sheet, means for automatically returning the logging sheet from the latter segmental area to the former segmental area prior to the initiation of a new scanning interval so that recorded data for a subsequent scanning interval are recorded opposite the data of the corresponding variables, and means responsive to the existence of an abnormal variable for providing a distinguishing characteristic to at least a part of the printing associated with the typed data on the abnormal variable.

22. In a logging system having a scanning means for repeatedly scanning a large number of variables, an automatic typewriter to record data on the variables, control means for sequentially feeding the scanned data into the typewriter for printing so that data on the same variables are recorded in the same vertical columns during spaced scanning intervals, and support means on the carriage of the typewriter for supporting a logging sheet on which the data are to be printed, means for indexing said logging sheet a fixed number of lines lengthwise thereof sufficient to accommodate data on a given number of variables over a given time period, when a line is completed before the completion of the recording of a given amount of data which a line on said logging sheet cannot accommodate, whereby said logging sheet is indexed from one segmental area to another segmental area thereof between the initiation of said spaced scanning intervals, and means for automatically returning the logging sheet from the latter segmental area to a line below the last printed line in said former segmental area prior to the initiation of a new scanning interval so that scanned data for said variables during said new interval are recorded in the same vertical columns in said former segmental area as for previously recorded data therein.

23. In a logging system, scanning means for continuously scanning a number of variables, recording means to record data on the variables, control means for controlling the feeding of scanned data from said scanning means to said recording means, said control means including means for sequentially feeding data on the variables scanned in one cycle to said recording means at regular spaced intervals for recording and which otherwise normally prevents the feeding of scanned data to said recording means, fault sensing means for sensing abnormal variables between said regular spaced intervals, and means responsive to said fault sensing means to cause said scanning means to feed data on abnormal variables occurring between said regular spaced intervals to said recording means for recording.

References Cited in the file of this patent

UNITED STATES PATENTS

| Number | Name | Date |
|---|---|---|
| 762,666 | Wallman | June 14, 1904 |
| 1,017,844 | Barron | Feb. 20, 1912 |
| 1,247,151 | Roberts | Nov. 20, 1917 |
| 2,255,011 | Lake et al. | Sept. 2, 1941 |
| 2,448,842 | Tholstrup | Sept. 7, 1948 |